Figure 1:
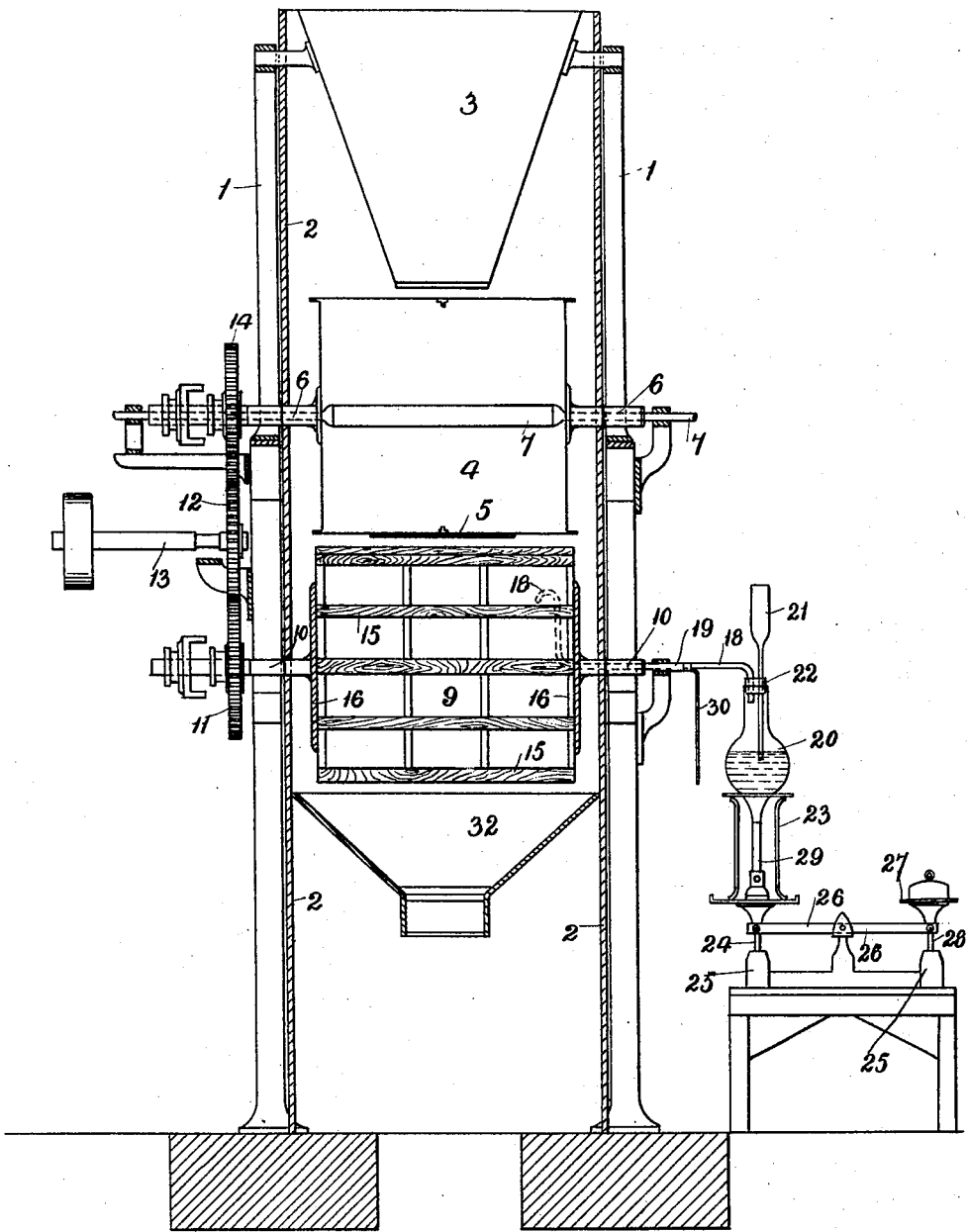

No. 773,469. PATENTED OCT. 25, 1904.
W. BROWNING & J. J. BARLOW.
PROCESS OF MAKING SOLUBLE STARCH.
APPLICATION FILED NOV. 24, 1903.
NO MODEL. 2 SHEETS—SHEET 1.

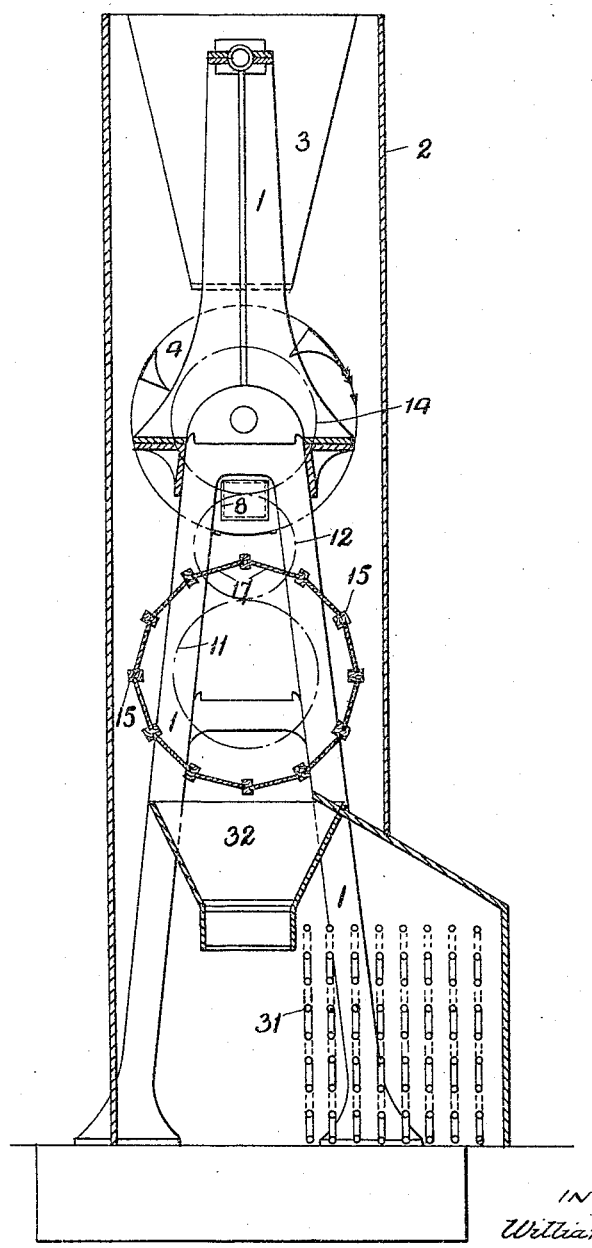

No. 773,469. Patented October 25, 1904.

UNITED STATES PATENT OFFICE.

WILLIAM BROWNING AND JOHN JAMES BARLOW, OF ACCRINGTON, ENGLAND.

PROCESS OF MAKING SOLUBLE STARCH.

SPECIFICATION forming part of Letters Patent No. 773,469, dated October 25, 1904.

Application filed November 24, 1903. Serial No. 182,502. (No specimens.)

*To all whom it may concern:*

Be it known that we, WILLIAM BROWNING, works manager, and JOHN JAMES BARLOW, chemist, both of Broad Oak Works, Accrington, in the county of Lancaster, England, have invented a certain new and useful Improved Process for the Production of Soluble Starch and Dextrine, of which the following is a specification.

Our invention relates to an improved process for the production of soluble starch and dextrine; and the chief object of our invention is to produce soluble starch and dextrine from starch in the form of powder and acid in the state of gas, vapor, or fine spray.

In carrying our invention into effect we employ the ordinary starch of commerce made from potatoes, tapioca, sago, wheat, maize, rice, or other kind of starch in the form of powder and the acid in the state of gas, vapor, or fine spray, which may be mixed together in any suitable apparatus; but in order that the soluble starch or dextrine may be produced in an economical and rapid manner we propose to employ the apparatus described in the specification to our United States application of even date herewith, and which is illustrated in the accompanying drawings, in which—

Figure 1 is a front sectional elevation, and Fig. 2 is a side sectional elevation, of the machine.

In the figures, 1 denotes the frame or standards, to which are secured boards or plates 2, forming a chamber, at the top of which is mounted a hopper 3, below which is mounted in bearings carried by the standards 1 a cylinder 4, made, preferably, of tin-plate, or it might be of other suitable material. The cylinder 4 is for heating the powdered starch, which is first charged into the hopper 3 and thence passed into the cylinder 4 through a sliding door 5. The trunnions 6 of the cylinder are hollow, and a steam-pipe 7 passes through them and the cylinder 4 to heat the powdered starch contained therein. A door 8 (see Fig. 2) is also fitted at one end of the cylinder 4 to facilitate examination and enable the contents to be stirred when required.

Below the cylinder 4 is mounted in bearings in the standards 1 a second cylinder 9, which forms the converter. One of the trunnions 10 may be solid, while the other is hollow, and on the solid trunnion is fixed a spur-wheel 11, which receives motion from a spur-wheel 12, fixed on the driving-shaft 13. The spur-wheel 12 also gears into a spur-wheel 14, fixed on one of the trunnions 6, and so gives motion to the drying-cylinder 4; but instead of the arrangement shown and above described any other suitable driving-gear for rotating or oscillating the cylinders 4 and 9 may be employed. The converter 9 is preferably made of wood only or of wood lined with glass, slate, earthenware, or other acid-resisting material. In the drawings it is shown made up of twelve sides or panels fitted in grooves in longitudinal ribs or rails 15, which are carried by the ends 16 of the converter, and two of the panels are fitted as doors 17 to slide out endwise when required to transfer the heated starch powder from the cylinder 4 to the converter 9 and to enable the soluble starch or dextrine to be removed from the latter after the operation of conversion has been concluded.

Through the hollow trunnion 10 of the converter 9 passes a pipe 18, of glass, earthenware, or other suitable material, which inside the converter is bent upward into the form of a swan-neck and may either have an open end or be perforated with small holes. The straight part of the pipe 18 outside the bearing is held firm and prevented from rotating by a clamp 19, and the pipe may be supplied with acid-vapor from any suitable source of supply. For example, as shown, we may employ the device of a balanced flask for convenience in regulating the supply and ascertaining by weight the amount of acid consumed. In this arrangement the flask 20 is supplied with acid through a filling-tube 21, and the end of the pipe 18 is bent downward and passes into the flask through the cork or stopper 22, which also supports the filling-tube. The flask 20 rests on a metal stand 23, the stem 24 of which is fitted to slide in a guide-block 25, and to the sliding stem 24 is pivoted one end of the balance-arm 26 of a weighing appliance, the weight-tray 27 of which is pivoted to the other end of the balance-arm and has a stem 28 fitted to slide in a second guide-block 25. In the metal stand 23 is placed an atmospheric-gas burner 29, supplied with gas by means of a flexible or telescopic pipe, (not shown,) and this burner supplies the necessary heat for distilling the acid in the flask 20 and driving it in the state of gas or vapor through the swan-neck pipe 18 into the converter 9, where it is absorbed by the heated starch powder. Any acid-gas condensing in the pipe 18 is carried away by a small drain-pipe 30, connected thereto.

The chamber formed by the standards 1 and the boards 2, which incase the hopper 3, heating-cylinder 4, and converter 9, may be provided with doors at certain points to give access to certain parts of the apparatus where necessary, and the chamber is heated by an arrangement of steam-pipes 31, suitably placed near the bottom of the chamber, as shown in Fig. 2.

In operation the powdered starch is charged through the hopper 3 into the cylinder 4 while the sliding door 5, Fig. 1, is open. Then the door 5 is closed and the cylinder 4 rotated until the starch has been heated to the required temperature. The machine is then stopped with the sliding door 5 at the bottom of the heating-cylinder and immediately over the sliding panels 17, which will then be at the top of the converter 9, so that by sliding out the panels 17 and opening the door 5 the heated starch powder can be transferred from the cylinder 4 to the converter 9. Then the doors 5 and 17 are closed, the machine restarted, and acid-vapor from the flask 20 is allowed to enter the gently-rotating converter 9 and act upon the starch powder therein, which is maintained at the required temperature, and the treatment continued until the starch is converted into soluble starch or dextrin, as required, and which is determined by the temperature. At the end of the process the material in the converter 9 can be discharged through the sliding panels 17 into the hopper 32 below the converter and thence into any convenient receptacle.

The amount of acid consumed can be determined and regulated by weighing the amount in the flask at the beginning and at the end or at any intermediate stage in the process of conversion.

The converter is maintained at a temperature of about 130° Fahrenheit, and the starch, which normally contains some moisture, is preferably partially dried and heated to the above-specified temperature before it enters the converter in order to accelerate the operation. When the starch is in the converter, the latter is slowly rotated or oscillated, and a suitable acid, such as hydrochloric acid or nitric acid, (preferably hydrochloric acid,) is introduced to the converter through the swan-neck tube in the form of gas, vapor, or fine spray, and the heating at a temperature of about 130° Fahrenheit is continued until a sample of the starch taken out of the converter and tested by boiling it in about an equal weight of water is found to dissolve into a thin and clear solution. When dextrine is required, it is only necessary to increase the temperature, say, from 170° to 200° Fahrenheit, or even higher.

The acid is vaporized in any convenient manner, preferably by heating it in a balanced flask, as described above, in order that we may be readily able to ascertain and determine by weight the exact amount of acid supplied to the converter. As an example we take, say, six hundred pounds of powdered starch, preferably heat it to about 130° Fahrenheit, and then introduce it into the converter, where it is maintained at about the same temperature, and while the converter is slowly rotated or oscillated we subject the heated starch powder to the action of about six pounds, by weight, of ordinary commercial hydrochloric acid or other suitable acid in the form of vapor or fine spray until a sample of the starch thus treated will dissolve in boiling water, giving a thin clear solution which gelatinizes on cooling. The length of time required from when the acid is introduced into the converter will be about two and a half to three hours at a constant temperature of about 130° Fahrenheit. To produce dextrine in place of soluble starch, the operation is carried out in identically the same manner for the same time and with the same materials, but at a higher temperature— say at a temperature of about 170° Fahrenheit. If desired, the soluble starch, as also the dextrine, can be neutralized with some suitable alkali, such as ammonia-vapor, while in the converter or subsequently, although in many cases this will not be necessary.

We prefer to employ hydrochloric acid on account of its cheapness and facility of using; but we do not confine ourselves to this one acid, as we find that the gas, vapor, or fine spray from other acids—such as sulfuric, nitric, tartaric, and citric—are capable of reacting in a similar manner.

It is an advantage to have the acid-vapor or fine spray sent into the converter in a heated condition, although this is not essential to the final result. The operation is facilitated and accelerated if the powdered starch be dried and heated as described to approximately the temperature required before the acid-vapor is introduced, although this, again, is not essential.

We do not limit ourselves to any particular proportions of starch and acid, as we find that with even less acid-vapor or spray than the proportion herein given as an example we can produce the required result, but longer time is necessary. Again, we may increase the quantity of acid; but we do not find any advantage in so doing. In like manner we do not confine ourselves strictly to the temperatures specified, inasmuch as soluble starch can be produced by our improved process at temperatures ranging from 70° to 150° Fahrenheit, although at the higher temperatures—say over 130° Fahrenheit—there is a tendency for the production of dextrine. Also with regard to dextrine we find this body to be most rapidly produced at temperatures ranging between 170° to 200° Fahrenheit, although it can be produced to some extent at temperatures outside these limits.

What we claim as our invention, and desire to secure by Letters Patent of the United States, is—

1. The herein-described process for the production of soluble starch from powdered starch consisting in heating said starch to about 145° Fahrenheit and subsequently treating the heated starch powder while being agitated and maintained at about the said temperature with a suitable acid in the form of vapor.

2. The herein-described process for the production of soluble starch from powdered starch consisting in heating said starch to about 145° Fahrenheit and subsequently treating the heated powder while being agitated and maintained at about the said temperature with hydrochloric acid in the form of vapor.

In witness whereof we have hereunto set our hands in presence of two witnesses.

WILLIAM BROWNING.
JOHN JAMES BARLOW.

Witnesses:
HENRY BERNOULLI BARLOW,
HERBERT ROWLAND ABBEY.